(12) United States Patent
Okamura (10) Patent No.: US 6,864,734 B2
(45) Date of Patent: Mar. 8, 2005

(54) SEMICONDUCTOR INTEGRATED CIRCUIT

(75) Inventor: Junichi Okamura, Tokyo (JP)

(73) Assignee: Thine Electronics, Inc., Tokyo (JP)

( * ) Notice: Subject to any disclaimer, the term of this patent is extended or adjusted under 35 U.S.C. 154(b) by 0 days.

(21) Appl. No.: 10/467,666

(22) PCT Filed: Dec. 25, 2001

(86) PCT No.: PCT/JP01/11358

§ 371 (c)(1),
(2), (4) Date: Aug. 11, 2003

(87) PCT Pub. No.: WO02/065690

PCT Pub. Date: Aug. 22, 2002

(65) Prior Publication Data

US 2004/0051571 A1 Mar. 18, 2004

(30) Foreign Application Priority Data

Feb. 14, 2001 (JP) ........................................ 2001-036657

(51) Int. Cl.⁷ ............................................... H03K 3/00
(52) U.S. Cl. ........................ 327/291; 327/147; 327/156
(58) Field of Search .................................. 327/291, 141, 327/144–147, 155–156, 161, 292, 295–299

(56) References Cited

U.S. PATENT DOCUMENTS 5,519,718 A * 5/1996 Yokev et al. ............... 375/133
5,950,115 A * 9/1999 Momtaz et al. ............. 455/73

FOREIGN PATENT DOCUMENTS

| JP | 8-56240 A | 2/1996 |
|---|---|---|
| JP | 11-88447 A | 3/1999 |
| JP | 11-98130 A | 4/1999 |
| JP | 2000-31951 A | 1/2000 |

* cited by examiner

*Primary Examiner*—Timothy P. Callahan
*Assistant Examiner*—Cassandra Cox
(74) *Attorney, Agent, or Firm*—Sughrue Mion, PLLC (57) ABSTRACT

A semiconductor integrated circuit which realizes a reception circuit that can stably detect symbol values even in a case where, in the reception of serial transmission data, the serial transmission data has its phase shifted relative to the sampling clock signals or has its waveform degraded due to the deviation of the delay of a signal in a transmission line. The semiconductor integrated circuit comprises a first clock-signal generating circuit which generates a clock signal of N phases synchronized with an input clock signal, a second clock-signal generating circuit which generates a clock signal of M phases synchronized with one phase selected from among the N-phase clock signal generated by the first clock-signal generating circuit, and in which N≠M holds, and a computation circuit which finds a control value for use in selecting one phase from among the N-phase clock signal, on the basis of the logic value of the serial transmission data sampled using the N-phase clock signal and the M-phase clock signal.

21 Claims, 10 Drawing Sheets

| N | M | M/N-1 | NUMBER OF SAMPLING POINTS | SKEW(deg) |
|---|---|---|---|---|
| 5 | 8 | 0.60 | 10 | 27.00 |
| 6 | 8 | 0.33 | 12 | 15.00 |
| 7 | 8 | 0.14 | 14 | 6.43 |

FIG.7B

| X | M | — | NUMBER OF SAMPLING POINTS | SKEW(deg) |
|---|---|---|---|---|
| 3 | 8 | — | 24 | 15.00 |
| 4 | 8 | — | 32 | 11.25 |

SEMICONDUCTOR INTEGRATED CIRCUIT

TECHNICAL FIELD

The present invention relates generally to semiconductor integrated circuits, and more particularly to a semiconductor integrated circuit for realizing a reception circuit which receives serial transmission data.

BACKGROUND ART

Heretofore, in receiving serial transmission data in the high-speed serial transmission of a digital signal (data), a scheme has been generally employed wherein the serial transmission data is sampled by using a sampling clock signal which has a frequency equal to a bit rate of the serial transmission data and which is synchronized with the serial transmission data.

In accordance with such a simple sampling scheme, however, when sampling the serial transmission data by using the sampling clock signal, the phase of the serial transmission data is shifted relative to that of the sampling clock signal due to a deviation of signal delay in a transmission line (this phenomenon is called as "skew"), or the waveform of the serial transmission data itself is degraded, so that symbol values cannot be perfectly detected in some cases.

In the design of a reception circuit which receives the digital signal serially transmitted at high speed, therefore, a circuit technique has become important which can stably detect the symbol values even in the case where such a degraded serial transmission data has been received.

In recent years, an oversampling scheme, which detects the symbol values at a number of sampling points larger than a number of bits of the serial transmission data, has been employed as a sampling scheme which is effective for stably detecting the symbol values even in the case of receiving the serial transmission data having the waveform degraded in the transmission line.

For example, U.S. Pat. No. 5,802,103 discloses an example of a fully duplexed transmission system wherein reception data is detected by using the oversampling scheme in high-speed serial transmission. As disclosed in the document, in the case of using a triple oversampling scheme, a phase shift of at most ±30% can be allowed with respect to a symbol period (which corresponds to the inverse number of a number which is obtained by multiplying a clock frequency by a number of bits in one data block) even when the phase of serial transmission data is shifted relative to the phase of the sampling clock signals.

Figure 1:
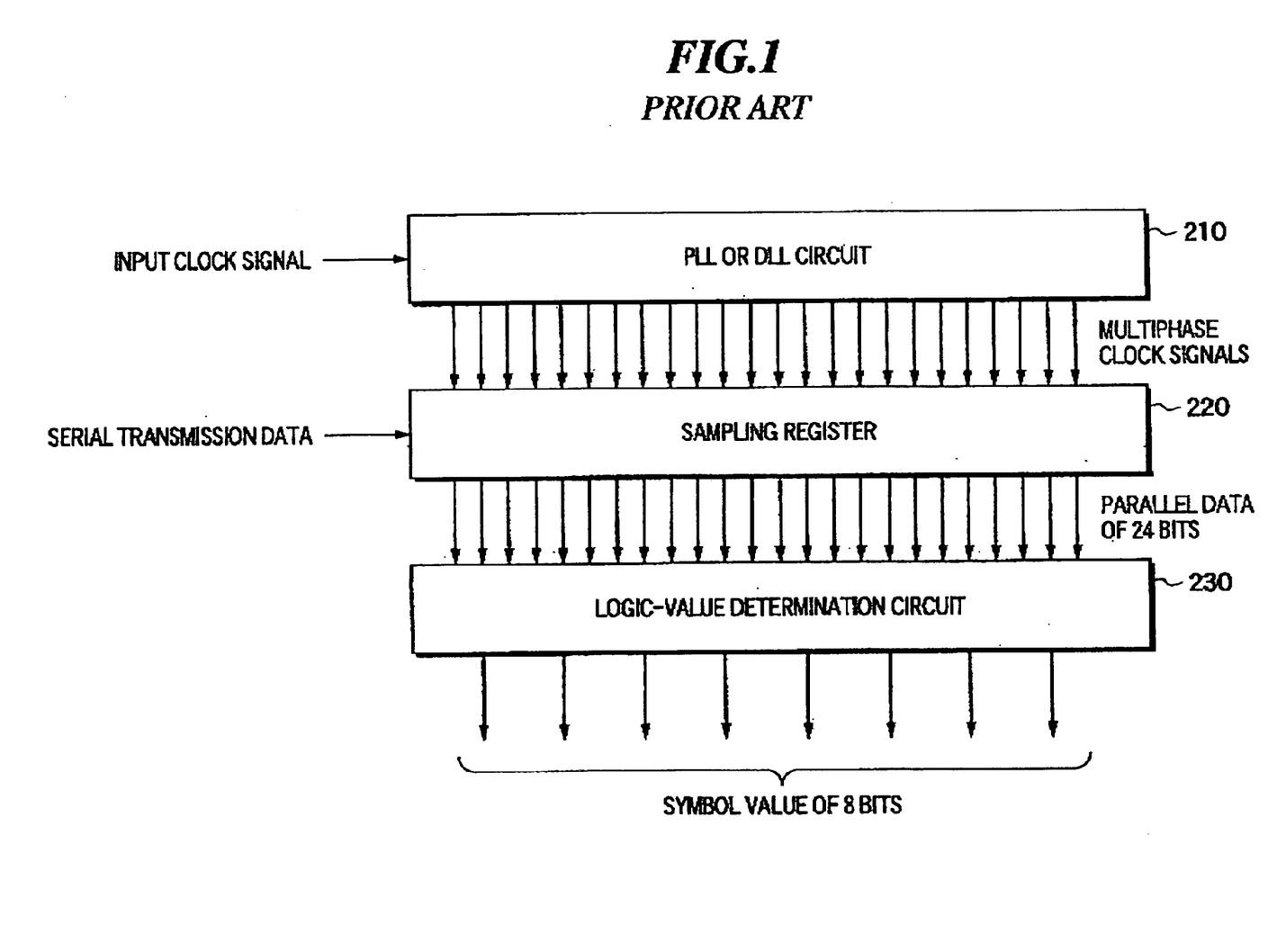
FIG. 1 is a block diagram showing an example of a prior-art reception circuit which employs an oversampling scheme.

FIG. 1 is a block diagram showing an example of a prior-art reception circuit which employs an oversampling scheme. In this example, a number of bits in one data block is 8 bits, and oversampling is performed at triple a bit rate of the serial transmission data.

As shown in FIG. 1, the reception circuit includes a PLL or DLL circuit 210 which generates from an input clock signal multiphase clock signals which afford a sampling rate at triple a bit rate of the serial transmission data, a sampling register 220 which oversamples the serial transmission data by using the multiphase clock signals, and a logic-value determination circuit 230 which determines symbol values of 8 bits included in one data block on the basis of the result of the oversampling.

The serial transmission data of one block (8 bits) inputted to the sampling register 220 is oversampled at 24 sampling points, which are triple the number of symbol bits, and the oversampled data is outputted as parallel data of 24 bits.

The logic-value determination circuit 230 executes a probability computation by using the parallel data, thereby to find the transition points of the serial transmission data. Further, the logic-value determination circuit 230 executes re-sampling for selecting appropriate parallel data of 8 bits from among the 24-bit parallel data obtained by the oversampling, on the basis of the transition points, thereby to finally determine the symbol values of 8 bits.

Figure 2:
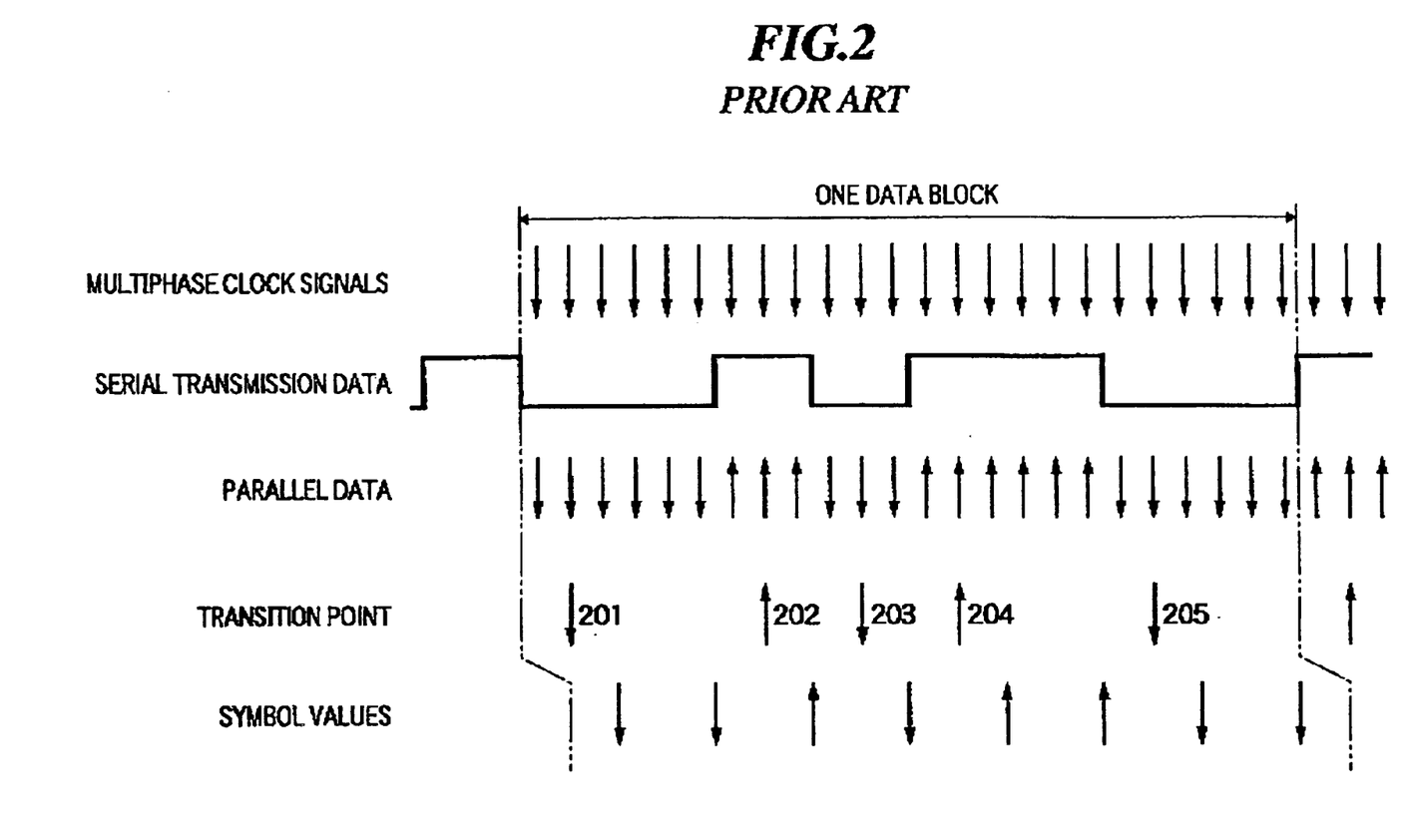
FIG. 2 is a diagram for explaining operations of the reception circuit shown in FIG. 1, in terms of logic values.

FIG. 2 is a diagram for explaining operations of the reception circuit shown in FIG. 1, in terms of logic values. One data block of the serial transmission data inputted to the reception circuit is oversampled by the multiphase clock signals which have a frequency being triple the bit rate thereof, with the result that the sampled data is outputted as the 24-bit parallel data which reflects the logic values of the serial transmission data.

The probability computation is executed by using the parallel data, whereby the transition points 201–205 are determined. By way of example, when the same logic value is consecutive twice in the sampled parallel data, the existence of the transition point is determined. The symbol values of 8 bits are determined from among the 24-bit parallel data, on the basis of the transition points thus determined.

In accordance with the oversampling scheme, however, a number of sampling clocks and a number of sampling circuits increase, so that a substrate area and a consumption current, which are required in a semiconductor integrated circuit, increase. In the design of a semiconductor integrated circuit employing an oversampling scheme at triple, quadruple or higher, therefore, the problem is coped with by adopting advanced minuter semiconductor technology, but there has been a problem that a manufacturing cost rises.

DISCLOSURE OF THE INVENTION

In view of the above, accordingly, an object of the present invention is to provide a semiconductor integrated circuit which realizes a reception circuit that can stably detect symbol values in the reception of serial transmission data even in the case where the serial transmission data has its phase shifted relative to the sampling clock signals or has its waveform degraded due to the deviation of delay of a signal in a transmission line and that can suppress increases in the number of sampling clock signals and the number of sampling circuits.

In order to solve the above problem, a semiconductor integrated circuit according to a first aspect of the present invention comprises a first clock-signal generating circuit for generating clock signals having N phases and synchronized with an input clock signal; a second clock-signal generating circuit for generating clock signals having M phases and synchronized with selected one of the clock signals having N-phases generated by the first clock-signal generating circuit, where N≠M; and a computation circuit for obtaining a control value for use in selecting one of the clock signals having N-phases, on the basis of logic values of serial transmission data sampled by using the clock signals having N-phases and the clock signals having M-phases.

Further, a semiconductor integrated circuit according to a second aspect of the present invention comprises a first clock-signal generating circuit for generating clock signals having N phases and synchronized with an input clock signal; a second clock-signal generating circuit for generating clock signals having M phases and synchronized with the input clock signal; and a computation circuit for obtaining a control value for use in changing a phase relationship between the clock signals having N-phases and the clock signals having M-phases, on the basis of logic values of serial transmission data sampled by using the clock signals having N-phases and the clock signals having M-phases.

The present invention is characterized by using two groups of multiphase clock signals which are synchronized with the input clock signal and which have different numbers of pulses in a time unit, that is, different frequencies. A first group of multiphase clock signals are used for measuring the phase alignment of the serial transmission data, while a second group of multiphase clock signals are used for measuring the phase alignment of the serial transmission data and for obtaining the symbol values of the serial transmission data. The phase of the second group of multiphase clock signals is adjusted by using a measured result of the phase alignment, whereby the phase of sampling clock signals can be secured which is always optimal relative to the transmission data.

As a result, even in a case where, in the reception of the serial transmission data, the serial transmission data has its phase shifted relative to the sampling clock signals or has its waveform degraded due to the deviation of the delay of a signal in a transmission line, the symbol values can be stably detected, and increase in the number of sampling clock signals or the number of sampling circuits can be suppressed.

BRIEF DESCRIPTION OF THE DRAWINGS

The advantages and features of the present invention will become apparent when the following detailed description and the drawings are considered in association. In these drawings, the same reference numerals designate the same constituents.

FIG. 7A is a diagram showing a number of samples required at a minimum and the phase adjustment range of the serial transmission data in a sampling scheme employed in the present invention, while

BEST MODE FOR CARRYING OUT THE INVENTION

Figure 3:
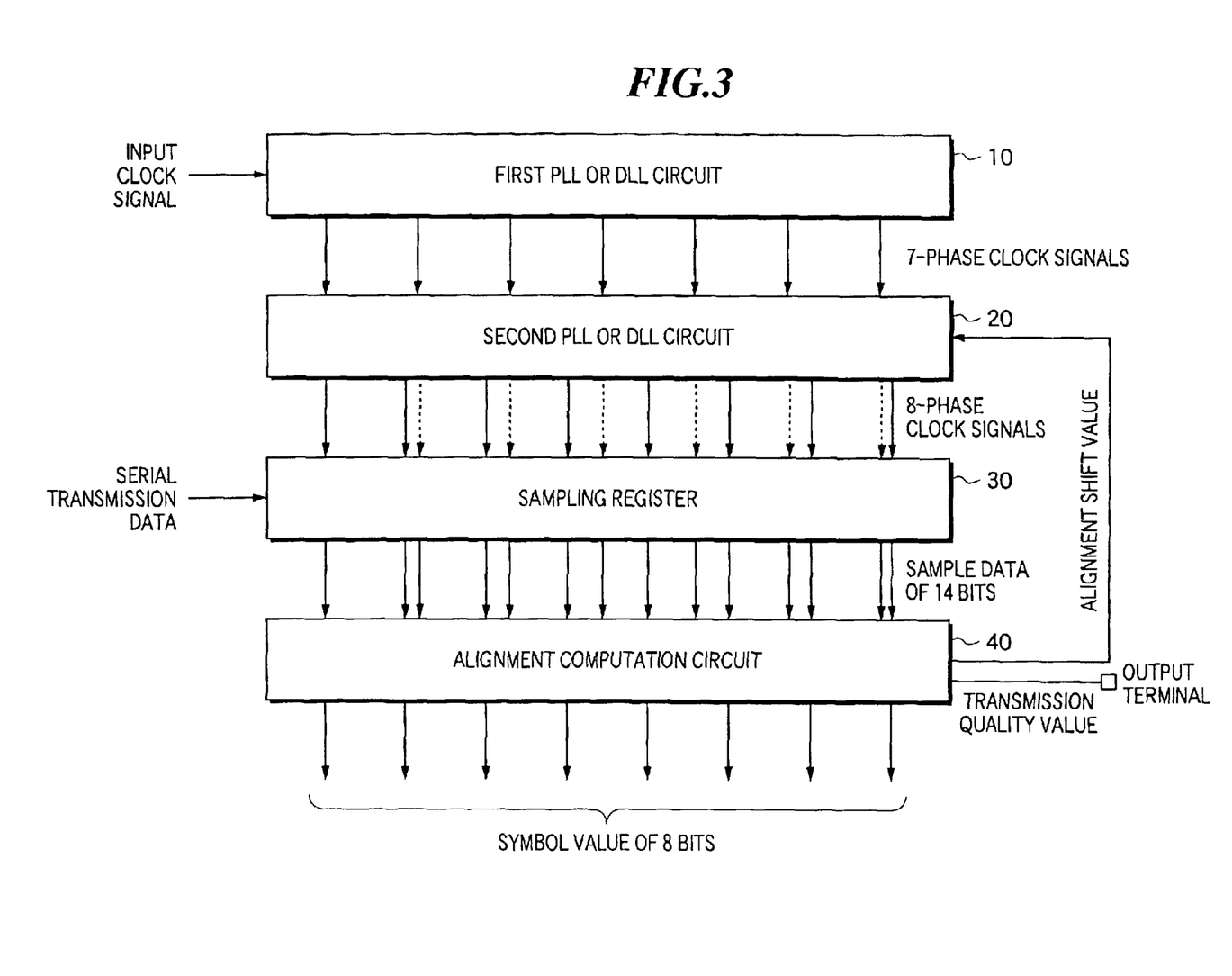
FIG. 3 is a block diagram showing an arrangement of a reception circuit which is realized by a semiconductor integrated circuit according to a first embodiment of the present invention.

FIG. 3 is a block diagram showing arrangement of a reception circuit which is realized by a semiconductor integrated circuit according to a first embodiment of the present invention. In this embodiment, a number of bits in one data block is 8 bits, and a phase adjustment capability is incarnated which is equivalent to or higher than that in the case of performing oversampling at triple a bit rate of the serial transmission data.

The reception circuit includes a first PLL or DLL circuit 10 for generating clock signals having N phases at equal intervals from an input clock signal, and a second PLL or DLL circuit 20 for generating clock signals which have M phases at equal intervals and which are synchronized with one of the N phases of the N-phase clock signals. The N-phase clock signals are used for measuring phase alignment of the serial transmission data, while the M-phase clock signals are used for measuring the phase alignment of the serial transmission data and for finding the symbol values of the serial transmission data. In this embodiment, 7-phase clock signals are used as the clock signals having N phases, and 8-phase clock signals as the clock signals having M phases.

Besides, the reception circuit includes a sampling register 30 which samples the serial transmission data at 14 (=N+M−1) sampling points that do not coincide between the 7-phase clock signals and the 8-phase clock signals. The serial transmission data inputted to the sampling register 30 is paralleled at a bit rate which is 1.75 times as high as a number of symbol bits, and the parallel data are outputted as sample data of 14 bits.

Further, the reception circuit includes an alignment computation circuit 40 which executes a probability computation by using the inputted 14-bit sample data, thereby to finally determine symbol values of 8 bits, an alignment shift value and a transmission quality value. The alignment shift value, which is outputted from the alignment computation circuit 40, is fed to the second PLL or DLL circuit 20.

Figure 4:
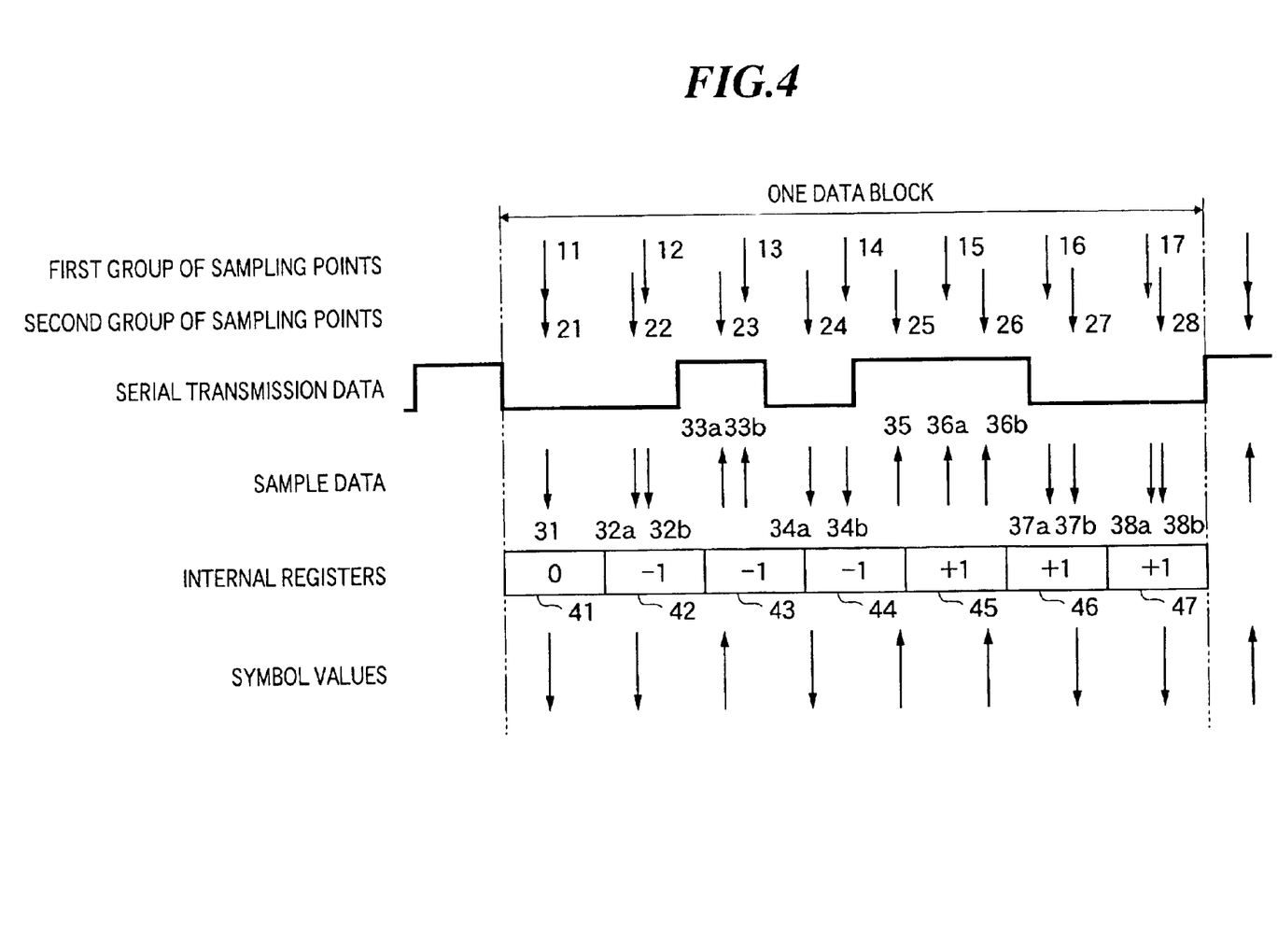
FIG. 4 is a diagram for explaining operations of the reception circuit shown in FIG. 3, in terms of logic values.

FIG. 4 is a diagram for explaining operations of the reception circuit shown in FIG. 3, in terms of logic values. The inputted serial transmission data is sampled at a first group of sampling points 11–17 which equally divide the period of one data block (8 bits) by 7, and a second group of sampling points 21–28 which equally divide the period of one data block by 8, and as a result the sampled data is outputted as sample data 31, 32a, 32b, 33a, 33b, 34a, 34b, 35, 36a, 36b, 37a, 37b, 38a and 38b of 14 bits.

The alignment computation circuit 40 shown in FIG. 3 computes the shift value of the serial transmission data from the appropriate phase alignment position thereof by using the 14-bit sample data.

There will now be described an example of the methods of computing the shift value of the serial transmission data from the appropriate phase alignment position thereof.

First, values in the internal registers 41–47 of the alignment computation circuit are reset to "0". Subsequently, the alignment computation circuit decides whether or not the logic value of the sample data 32*a* is equal to that of the sample data 32*b*, and it stores "−1" in the internal register 42 if the logic values are equal to each other. Likewise, the alignment computation circuit decides whether or not the logic value of the sample data 33*a* is equal to that of the sample data 33*b*, and it stores "−1" in the internal register 43 if the logic values are equal to each other. Likewise, the alignment computation circuit decides whether or not the logic value of the sample data 34*a* is equal to that of the sample data 34*b*, and it stores "−1" in the internal register 44 if the logic values are equal to each other.

On the other hand, the alignment computation circuit decides whether or not the logic value of the sample data 36*a* is equal to that of the sample data 36*b*, and it stores "+1" in the internal register 45 if the logic values are equal to each other. Likewise, the alignment computation circuit decides whether or not the logic value of the sample data 37*a* is equal to that of the sample data 37*b*, and it stores "+1" in the internal register 46 if the logic values are equal to each other. Likewise, the alignment computation circuit decides whether or not the logic value of the sample data 38*a* is equal to that of the sample data 38*b*, and it stores "+1" in the internal register 47 if the logic values are equal to each other.

The alignment shift value, which represents the shift magnitude of the serial transmission data from the appropriate phase alignment position thereof, can be computed by finding the summation of the values respectively stored in the internal registers 41–47. In the case where the serial transmission data exists at the appropriate phase alignment position, the alignment shift value becomes "0". Besides, the quality value, which represents the quality of a transmission line, can be computed by finding the summation of the absolute values of the values respectively stored in the internal registers 41–47. In the case where the quality of the transmission line is good, the transmission quality value becomes "6".

Simultaneously, the symbol values which are obtained by sampling the serial transmission data at the second group of sampling points 21–28 that equally divide the period of one data block by 8 is outputted as detection signals.

Next, there will be described another example of the methods of computing the shift value of the serial transmission data from the appropriate phase alignment position thereof.

Although "0", "−1" or "+1" is stored in each of the internal registers 41–47 in the foregoing example, "0" or "1" is stored in each of the internal registers 41–47 in this example. More specifically, the alignment computation circuit stores "1" in each internal register if the logic values of two sample data to be compared are equal to each other. Thereafter, the alignment computation circuit finds a sum SUM1 of values respectively stored in the internal registers 41–44 and a sum SUM2 of values respectively stored in the internal registers 45–47 so as to find a difference (SUM2−SUM1) of the sums. Thus, the alignment computation circuit can compute the alignment shift value which represents the shift magnitude of the serial transmission data from the appropriate phase alignment position thereof.

Figure 5:
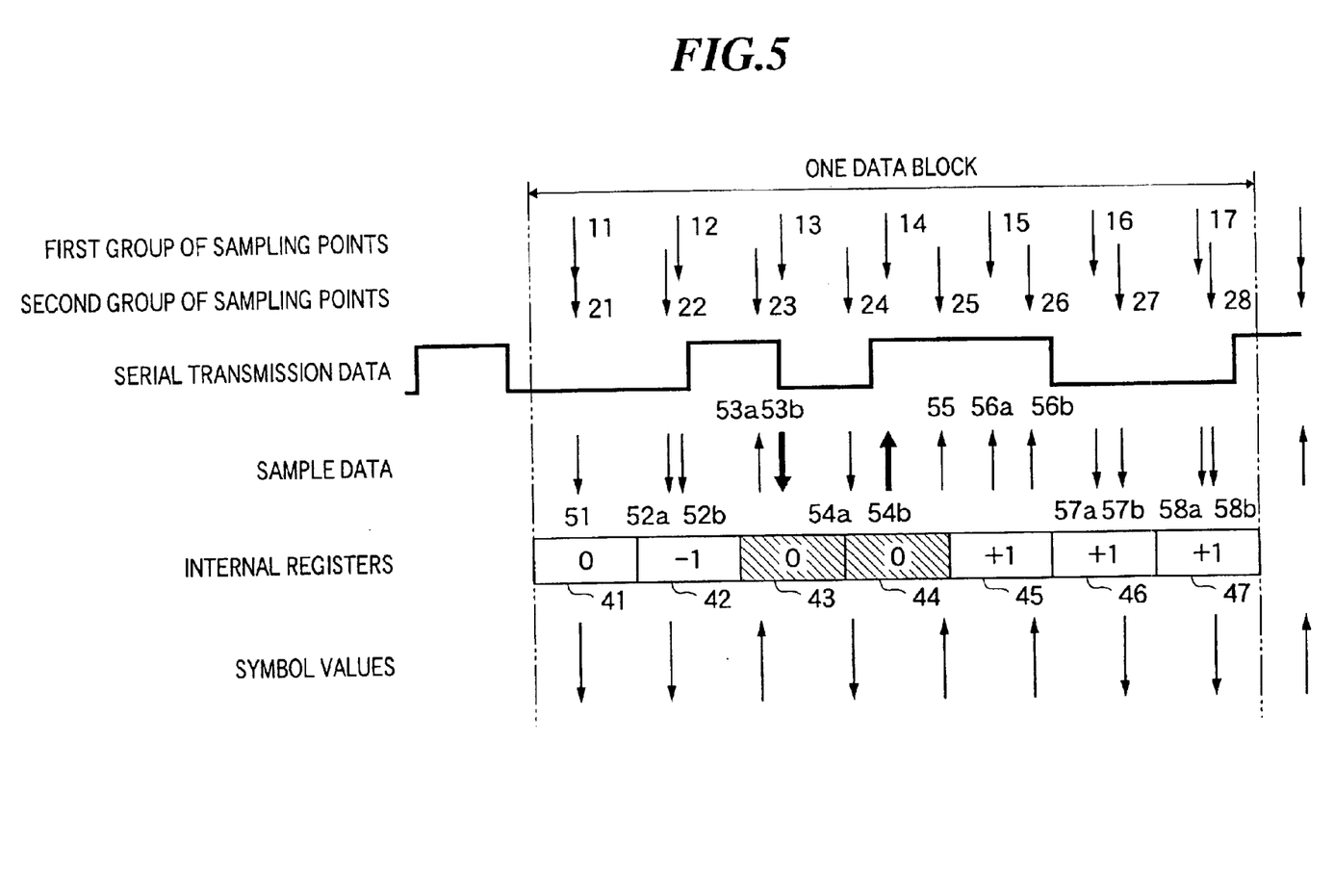
FIG. 5 is a diagram for explaining, in terms of logic value levels, an operation in the case where the phase of inputted serial transmission data shifts relative to that of sampling clock signals in the reception circuit shown in FIG. 3.

FIG. 5 is a diagram for explaining, in terms of logic value levels, operations in the case where the phase of the inputted serial transmission data shifts relative to that of the sampling clock signals in the reception circuit according to this embodiment. Such a situation is an example of degradation which occurs for the reason that a signal delay time in the transmission line differs between the serial transmission data and the clock signal.

The inputted serial transmission data is sampled at the first group of sampling points 11–17 and the second group of sampling points 21–28 which groups share one sampling point, and as a result the sampled data is outputted as sample data 51, 52*a*, 52*b*, 53*a*, 53*b*, 54*a*, 54*b*, 55, 56*a*, 56*b*, 57*a*, 57*b*, 58*a* and 58*b* of 14 bits.

Since the phase alignment of the serial transmission data to the sampling clock signals shifts, the summation of values respectively stored in the internal registers 41–47 in the alignment computation circuit, namely, the alignment shift value is obtained to be "+2" rather than "0". The phase alignment is adjusted in such a way that a clock signal to be selected as a reference phase from among the inputted 7-phase clock signals is altered on the basis of the alignment shift value in the second PLL or DLL circuit 20 (FIG. 3) which generates the sampling clock signals. Besides, the summation of the absolute values of the values respectively stored in the internal registers 41–47 in the alignment computation circuit, namely, the transmission quality value is obtained to be "4" rather than "6". This indicates that the quality of the reception data is lowered under the influences of the transmission line, etc.

Figure 6:
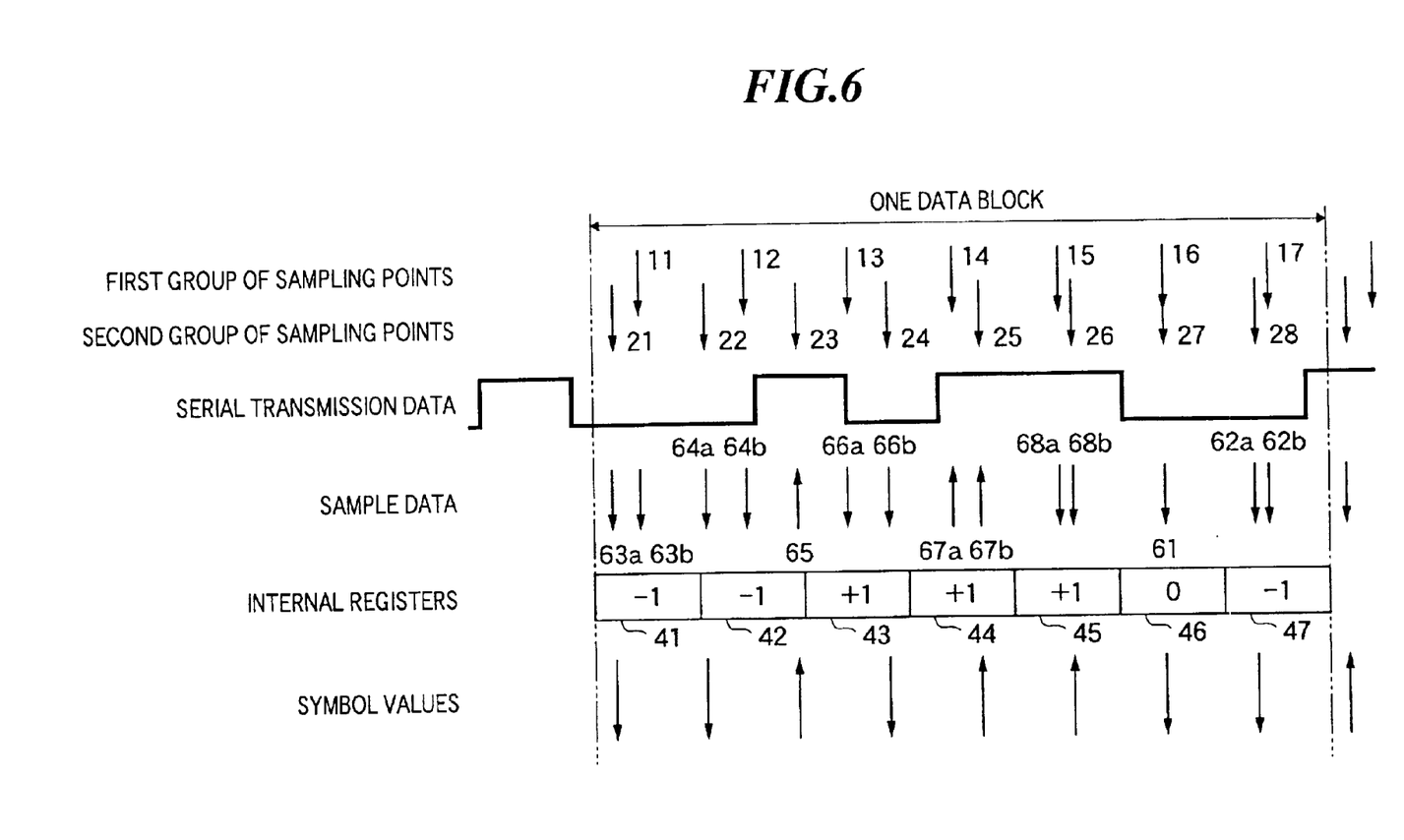
FIG. 6 is a diagram for explaining an operation after the adjustment of the phase shift shown in FIG. 5, in terms of logic value levels.

FIG. 6 is a diagram for explaining operations after the adjustment of the phase shift shown in FIG. 5, in terms of logic value levels. Since the computed alignment shift value is "+2" in FIG. 5, the clock signal to be selected in the second PLL or DLL circuit 20 (FIG. 3) is shifted by "−2", whereby the clock signal affording the sampling point 11 is altered to the clock signal affording the sampling point 16, and the internal registers 41–47 are reset. Alternatively, the clock signal to be selected may well be determined after computed alignment shift values are integrated over a predetermined time period and then averaged.

The inputted serial transmission data is sampled at the sampling points arrayed anew, and as a result the sampled data is outputted as sample data 63*a*, 63*b*, 64*a*, 64*b*, 65, 66*a*, 66*b*, 67*a*, 67*b*, 68*a*, 68*b*, 61, 62*a* and 62*b* of 14 bits. Thereafter, the alignment shift value is computed again by using values respectively stored in the internal registers 41–47. Since the reference sampling point has shifted by "−2", the alignment shift value becomes "0" again. Besides, the transmission quality value is resumed to "6".

As described above, the phase relationship between the serial transmission data and the sampling clock signals is always adjusted by using the computed result in the alignment computation circuit, whereby the symbol values can be stably detected against the degradation (such as the skew) of the signal waveform in the transmission line on the basis of a small number of data samplings.

Figure 7A:
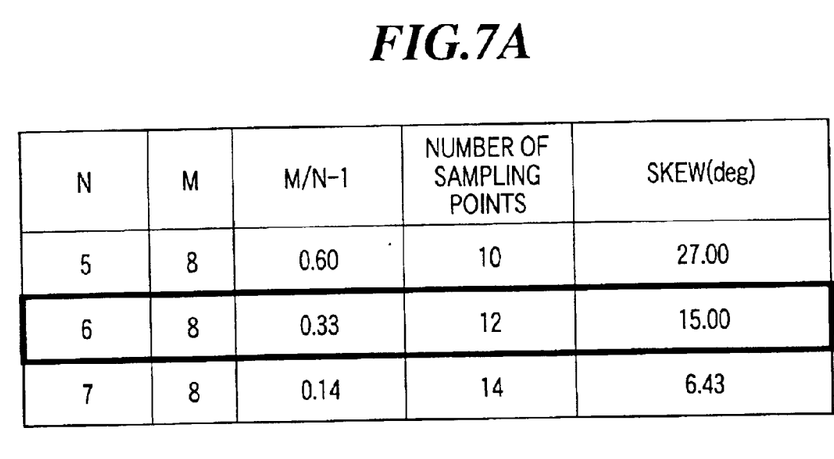
Figure 7B:
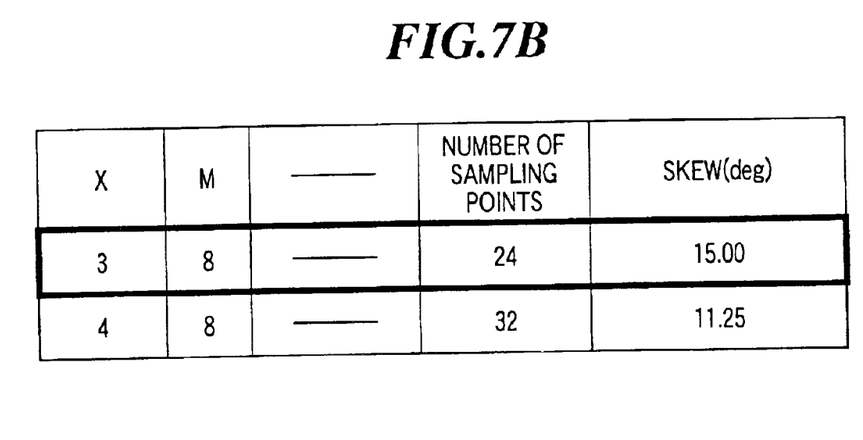
FIG. 7B is a diagram showing a number of samples required at a minimum and the phase adjustment range of serial transmission data in the oversampling scheme employed in the prior-art example.

FIG. 7A shows the number of samples required at a minimum and the phase adjustment range of the serial transmission data in the sampling scheme using the N-phase clock signals and the M-phase clock signals as is employed in the present invention. On the other hand, FIG. 7B shows the number of samples required at a minimum and the phase adjustment range of the serial transmission data in the X-fold oversampling scheme employed in the prior-art example. It is understood by comparing both the sampling schemes that, when (M/N−1) is smaller than ⅓ in the case of N≦M, the scheme employed in the present invention is capable of finer phase adjustments than the triple oversampling scheme employed in the prior-art example. Incidentally, N>M may well be set, and in that case, when (N/M−1) is smaller than ⅓, the scheme employed in the present invention becomes capable of finer phase adjustments than the triple oversampling scheme employed in the prior-art example.

Figure 8:
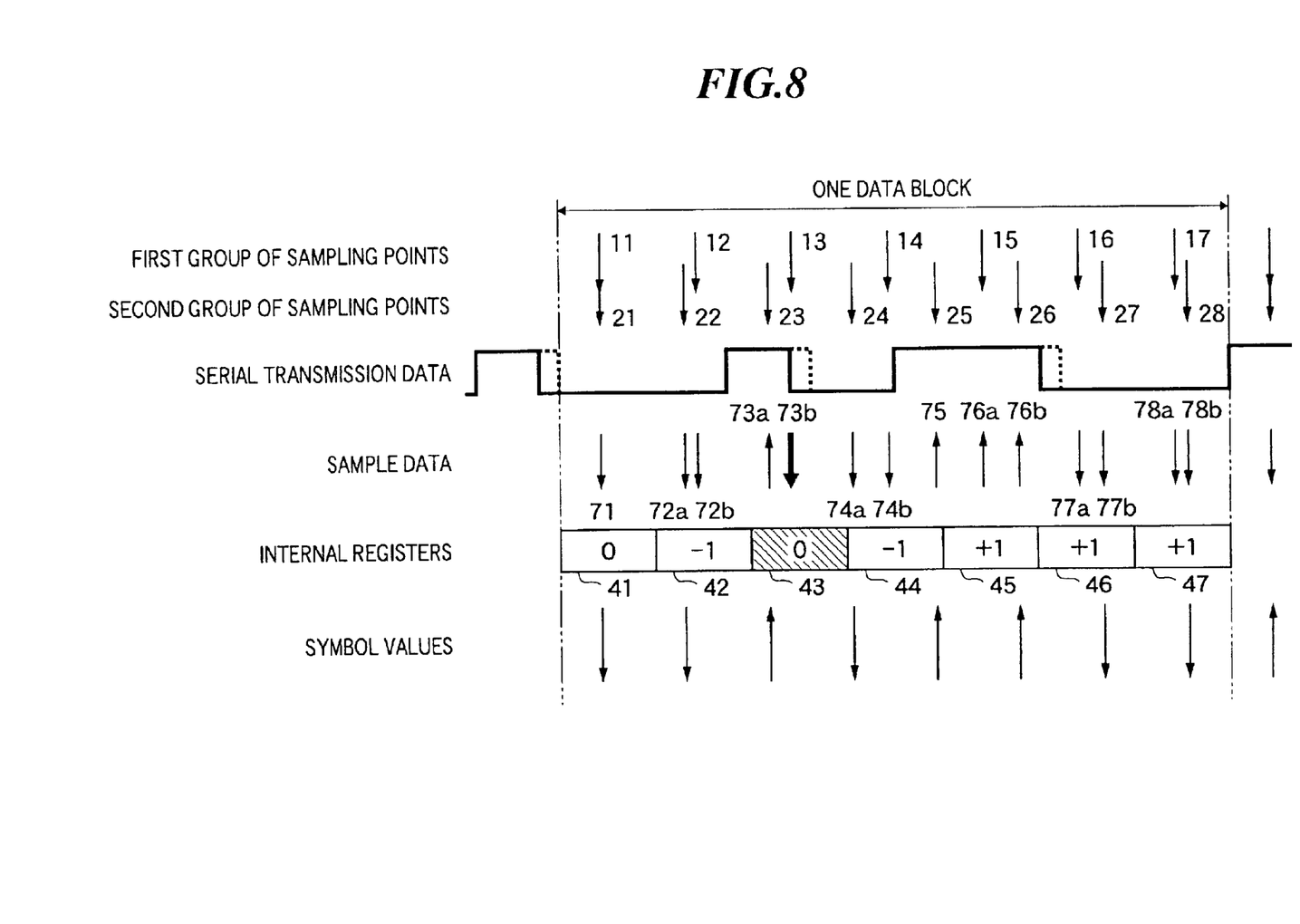
FIG. 8 is a diagram for explaining, in terms of logic value levels, an operation in the case where the phase of the inputted serial transmission data shifts in an unbalanced fashion relative to that of the sampling clock signals in the reception circuit shown in FIG. 3.

FIG. 8 is a diagram for explaining, in terms of logic value levels, operations in the case where the phase of the inputted serial transmission data shifts in an unbalanced fashion relative to that of the sampling clock signals in the reception circuit shown in FIG. 3. Such a situation is an example of degradation which occurs for the reasons that a signal delay time differs between the serial transmission data and the clock signal in a balanced transmission line, and that a signal delay time becomes different also between two transmission lines included in the balanced transmission line.

The inputted serial transmission data is sampled at the first group of sampling points 11–17 which equally divide the period of one data block by 7, and the second group of sampling points 21–28 which equally divide the period of one data block by 8 in synchronism with one of the first group of sampling points (the sampling point 11 in FIG. 8), and as a result the sampled data is outputted as sample data 71, 72a, 72b, 73a, 73b, 74a, 74b, 75, 76a, 76b, 77a, 77b, 78a and 78b of 14 bits.

In FIG. 8, since the trailing edges of the inputted serial transmission data shift relative to the phase of the sampling clock signals, the alignment shift value computed on the basis of the inputted 14-bit sample data in the alignment computation circuit 40 (FIG. 3) results in "+1" rather than "0". The selection of a clock signal in the second PLL or DLL circuit 20, which generates the sampling clock signals, is altered on the basis of the alignment shift value, whereby the phase alignment is adjusted.

Figure 9:
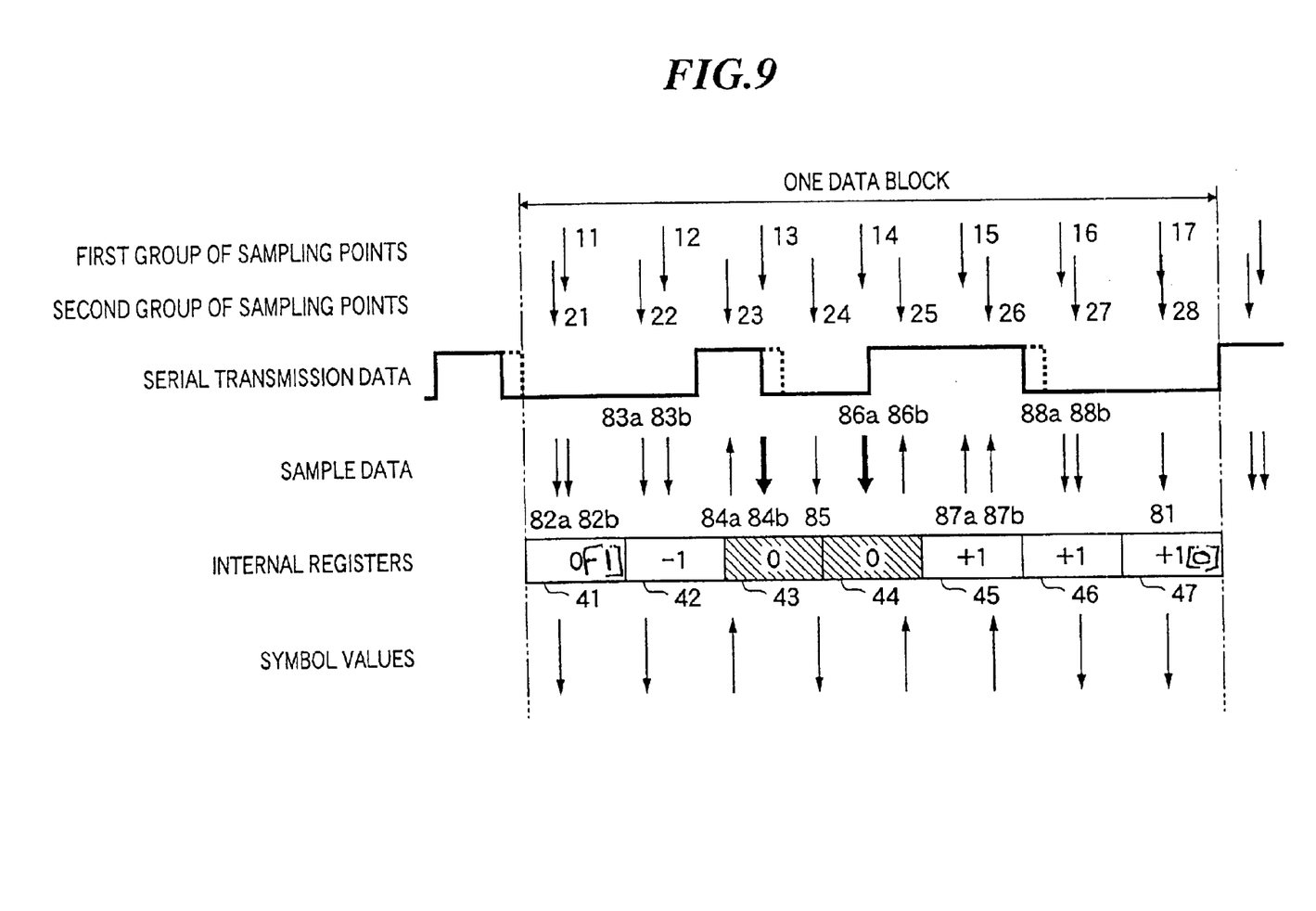
FIG. 9 is a diagram for explaining an operation after the adjustment of the unbalanced phase shift shown in FIG. 8, in terms of logic value levels.

FIG. 9 is a diagram for explaining operations after the adjustment of the unbalanced phase shift shown in FIG. 8, in terms of logic value levels. Since the computed alignment shift value is "+1", the clock signal to be selected from among the 7-phase clock signals affording the sampling points 11–17 is shifted by "−1", whereby the clock signal to be selected is altered from the clock signal affording the sampling point 11 to the clock signal affording the sampling point 17. Alternatively, the clock signal to be selected may well be determined after computed alignment shift values are integrated over a predetermined time period and then averaged.

The inputted serial transmission data is sampled at the sampling points arrayed anew, and as a result the sampled data is outputted as sample data 82a, 82b, 83a, 83b, 84a, 84b, 85, 86a, 86b, 87a, 87b, 88a, 88b and 81 of 14 bits. When the alignment shift value is computed by using the sample data, it becomes "0" again because the phase of the sampling clock signals have shifted by "−1".

It is to be noted that the alignment shift value has become "0" in FIG. 9, but that the transmission quality value, which is the summation of the absolute values of the values held in the internal registers 41–47, is "4" unlike "6" in FIGS. 4 and 6. Unlike in the case shown in FIG. 5 where the serial transmission data is merely delayed relative to the sampling clock signals in the balanced transmission line, in the case where the serial transmission data having the inferior waveform is received because the delay time becomes different also between the two transmission lines included in the balanced transmission line, the transmission quality value becomes smaller even in the state where the phase alignment is held.

In this manner, according to this embodiment, the correcting direction of the phase alignment can be known by finding the summation of the values stored in the internal registers of the alignment computation circuit, and moreover, the quality of the transmission line can be grasped by finding the summation of the absolute values of the values stored in the internal registers of the alignment computation circuit.

In the general serial transmission line, it can easily occur that the quality of the transmission line fluctuates dynamically. In this case, if the quality (the degree of degradation) of the transmission line can be measured by a simple method, it is permitted to select a transmission method which corresponds to the quality of the transmission line. In, for example, a transmission line severely degraded, a transmission circuit is controlled to transmit serial transmission data by lowering a bit rate, whereby the stable transmission of the serial transmission data becomes possible. Likewise, it is possible to select a reception method which corresponds to the quality of the transmission line. For example, in a transmission line severely degraded, the gain of the initial stage of an amplifier is increased or waveform equalization is performed in a reception circuit, whereby the stable reception of serial transmission data becomes possible.

In accordance with this embodiment, it is permitted to realize the reception circuit which has the phase adjustment capability equivalent to or higher than that of the prior-art oversampling scheme, by using the clock signals which are much smaller in number than the clock signals required for the oversampling scheme. Thus, a performance which is equivalent to or higher than that of the oversampling scheme can be incarnated with lower consumption power.

Further, although the dynamic measurement of the quality of the serial transmission data has been difficult in the prior-art oversampling scheme, it is easily permitted in accordance with this embodiment. Thus, this embodiment can be dynamically adapted to the quality of the transmission line.

In this embodiment, there has been described the example which employs the PLL or DLL circuit in order to generate the N-phase clock signals synchronized with the input clock signal, and which employs the PLL or DLL circuit in order to generate the M-phase clock signals synchronized with one selected clock signal from among the N-phase clock signals. However, the present invention is realizable and effective even when another circuit, which can generate the multiphase clock signals having equal phase intervals, is employed. Besides, as to the number of the multiphase clock signals, the present invention is realizable and effective no matter what values are employed for N and M as long as N≠M.

Next, a semiconductor integrated circuit according to a second embodiment of the present invention will be described. This embodiment is such that the present invention is applied to a reception circuit having 3 channels for RGB digital image signals. In this embodiment, the number of bits of one data block is 10, and a phase adjustment capability is bestowed which is equivalent to or higher than that of quadruple oversampling.

Figure 10:
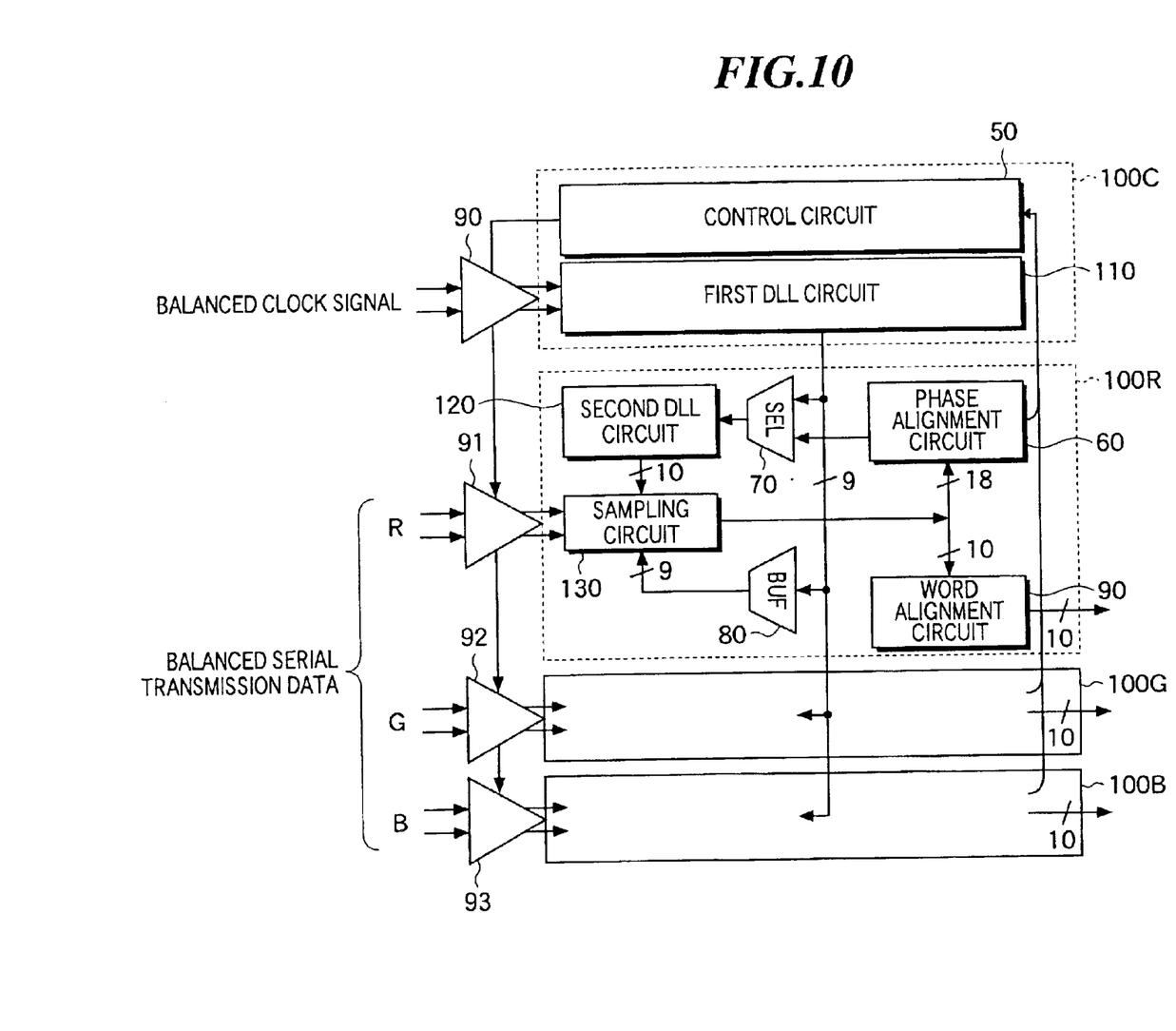
FIG. 10 is a block diagram showing an arrangement of a reception circuit which is realized by a semiconductor integrated circuit according to a second embodiment of the present invention.

FIG. 10 is a block diagram showing the arrangement of the reception circuit which is realized by the semiconductor integrated circuit according to the second embodiment of the present invention.

The reception circuit includes a common circuit block 100C, an R-channel circuit block 100R, a G-channel circuit block 100G and a B-channel circuit block 100B.

An inputted balanced clock signal and balanced serial transmission data of 3 channels are respectively amplified by differential amplifiers 90–93. Each of the differential amplifiers 90–93 has the function of adjusting the gain of its initial stage in accordance with a control signal supplied from a control circuit 50. In a first DLL circuit 110, the amplified balanced clock signal is converted into alignment measuring clock signals having 9 phases at equal intervals and synchronized with the inputted balanced clock signal.

In a clock-signal selection circuit 70 which is controlled by a phase alignment circuit 60, one clock signal is selected from among the 9-phase clock signals outputted from the first DLL circuit 110. A second DLL circuit 120 outputs symbol sampling clock signals having 10 phases and synchronized with the inputted balanced clock signal, on the basis of the selected clock signal.

The 9-phase clock signals subjected to wave-shaping in a local buffer 80 and the 10-phase clock signals outputted from the second DLL circuit 120 are inputted to a sampling circuit 130. The sampling circuit 130 samples the serial transmission data amplified by the differential amplifier 91 on the basis of the inputted clock signals, so as to output sample data of 18 (=10+9−1) bits.

The phase alignment circuit 60 obtains an alignment shift value, which represents information on the phase alignment of the serial transmission data, on the basis of the sampling data of 18 bits, and it feeds this alignment shift value back to the clock-signal selection circuit 70.

Simultaneously, the phase alignment circuit 60 finds a transmission quality value, which represents information on the transmission quality of the serial transmission data, on the basis of the sampling data of 18 bits, and it feeds this transmission quality value back to the control circuit 50. The control circuit 50 sets the gains of the initial stages of the differential amplifiers 90–93 on the basis of the transmission quality values for the 3 channels, whereby gain adjustments can be made in correspondence with the transmission qualities of the serial transmission data.

On the other hand, data of 10 bits sampled by using the sampling clock signals outputted from the second DLL circuit 120 are subjected to bit position alignment by a word alignment circuit 90, and they are thereafter outputted as parallel data.

Although the R-channel circuit blocks in the circuit blocks of the 3 channels of R, G and B have been described above, each of the remaining 2 channels is constructed of similar circuit blocks. Thus, even when the serial transmission data of the 3 channels have independently undergone phase delays relative to the clock signal, the transmission data can be stably received by employing the reception apparatus according to this embodiment.

Although the present invention has thus far been described in conjunction with the embodiments, it can be freely modified and altered within a scope defined in the claims, without being restricted to these embodiments.

INDUSTRIAL APPLICABILITY

A semiconductor integrated circuit according to the present invention is applicable in a device, such as liquid crystal display, having a reception circuit which receives serial transmission data.

What is claimed is:

1. A semiconductor integrated circuit comprising:
a first clock-signal generating circuit for generating clock signals having N phases and synchronized with an input clock signal;
a second clock-signal generating circuit for generating clock signals having M phases and synchronized with selected one of the clock signals having N phases generated by said first clock-signal generating circuit, where N≠M; and
a computation circuit for obtaining a control value for use in selecting one of the clock signals having N phases, on the basis of logic values of serial transmission data sampled by using the clock signals having N phases and the clock signals having M phases.

2. A semiconductor integrated circuit according to claim 1, wherein said second clock-signal generating circuit selects one of the clock signals having N phases generated by said first clock-signal generating circuit, as a clock signal defining a reference phase, on the basis of the control value obtained by said computation circuit.

3. A semiconductor integrated circuit according to claim 1, wherein said first clock-signal generating circuit generates the clock signals having N phases at equal intervals, and said second clock-signal generating circuit generates the clock signals having M phases at equal intervals.

4. A semiconductor integrated circuit according to claim 1, wherein at least one of said first clock-signal generating circuit and said second clock-signal generating circuit includes either one of a phase locked loop circuit and a delay locked loop circuit.

5. A semiconductor integrated circuit according to claim 1, wherein said first clock-signal generating circuit includes a phase locked loop circuit, and said second clock-signal generating circuit includes a delay locked loop circuit.

6. A semiconductor integrated circuit according to claim 1, wherein said first clock-signal generating circuit includes a delay locked loop circuit, and said second clock-signal generating circuit includes a phase locked loop circuit.

7. A semiconductor integrated circuit comprising:
a first clock-signal generating circuit for generating clock signals having N phases and synchronized with an input clock signal;
a second clock-signal generating circuit for generating clock signals having M phases and synchronized with one of the clock signals having N phases generated by said first clock-signal generating circuit, where N≠M; and
a computation circuit for obtaining a control value for use in changing a phase relationship between the clock signals having N phases and the clock signals having M phases, on the basis of logic values of serial transmission data sampled by using the clock signals having N phases and the clock signals having M phases.

8. A semiconductor integrated circuit according to claim 7 wherein said second clock-signal generating circuit shifts a phase of the clock signals having M phases by using as an unit of time period a phase difference period of the clock signals having N phases as an unit of time period, on the basis of the control value obtained by said computation circuit.

9. A semiconductor integrated circuit according to claim 7 wherein the clock signals having N phases and the clock signals having M phases respectively generated by the first and second clock-signal generating circuits define (N+M−1) different sampling points which include one common sampling point in one cycle of the input clock signal.

10. A semiconductor integrated circuit according to claim 9, wherein said computation circuit obtains a summation of values respectively corresponding to a plurality of combinations of predetermined 2 bits in (N+M−1) bits of parallel data which have been obtained by sampling the serial transmission data at the (N+M−1) different sampling points, thereby to obtain the control value which represents a shift of phase alignment of the serial transmission data relative to the clock signals having M phases.

11. A semiconductor integrated circuit according to claim 10, wherein said computation circuit uses as the predetermined 2 bits of the parallel data, 2 bits which have been sampled at a first sampling point in N sampling points represented by the clock signals having N phases and a second sampling point adjacent to the first sampling point in M sampling points represented by the clock signals having M phases.

12. A semiconductor integrated circuit according to claim 9, wherein said computation circuit obtains a summation of absolute values of values respectively corresponding to a plurality of combinations of predetermined 2 bits in (N+M−1) bits of parallel data which have been obtained by sampling the serial transmission data at the (N+M−1) different sampling points, thereby to obtain a value concerning a quality of the serial transmission data.

13. A semiconductor integrated circuit according to claim 12, further comprising:
   an amplifier having a variable gain; and
   a control circuit for changing the gain of said amplifier on the basis of the value concerning a quality of the serial transmission data obtained by said computation circuit.

14. A semiconductor integrated circuit according to claim 7, wherein said first clock-signal generating circuit generates the clock signals having N phases at equal intervals, and said second clock-signal generating circuit generates the clock signals having M phases at equal intervals.

15. A semiconductor integrated circuit according to claim 7, wherein at least one of said first clock-signal generating circuit and said second clock-signal generating circuit includes either one of a phase locked loop circuit and a delay locked loop circuit.

16. A semiconductor integrated circuit according to claim 7, wherein said first clock-signal generating circuit includes a phase locked loop circuit, and said second clock-signal generating circuit includes a delay locked loop circuit.

17. A semiconductor integrated circuit according to claim 7, wherein said first clock-signal generating circuit includes a delay locked loop circuit, and said second clock-signal generating circuit includes a phase locked loop circuit.

18. A reception circuit of a data transmission circuit comprising:
   a first clock-signal generating circuit for generating clock signals having N phases and synchronized with an input clock signal;
   a second clock-signal generating circuit for generating clock signals having M phases, where N≠M; and
   a sampling register for sampling serial transmission data at N+M−1 sampling points that do not coincide between the clock signals having N phases and the clock signals having M phases; and
   an alignment computation circuit for executing a probability computation by using the serial transmission data sampled at the N+M−1 sampling points, thereby to determine an alignment shift value that corresponds to shift magnitude of the serial transmission data from appropriate phase alignment position of the serial transmission data, and for feeding the alignment shift value to said second clock-signal generating circuit.

19. A reception circuit according to claim 18, wherein the clock signals having M phases generated by said second clock-signal generating circuit are synchronized with one of the clock signals having N phases generated by said first clock-signal generating circuit.

20. A phase alignment adjusting method comprising the steps of
   (a) generating clock signals having N phases and synchronized with an input clock signal;
   (b) generating clock signals having M phases, where N≠M; and
   (c) sampling serial transmission data at N+M−1 sampling points that do not coincide between the clock signals having N phases and the clock signals having M phases; and
   (d) executing a probability computation by using the serial transmission data sampled at the N+M−1 sampling points, thereby to determine an alignment shift value that corresponds to shift magnitude of the serial transmission data from appropriate phase alignment position of the serial transmission data; and
   (e) adjusting phase relationship between the serial transmission data and sampling clock signals to be used in step (c), by using the alignment shift value.

21. A phase alignment adjusting method according to claim 20, wherein the clock signals having M phases generated at step (b) are synchronized with one of the clock signals having N phases generated at step (a).

* * * * *